United States Patent
Carey

(10) Patent No.: US 11,734,524 B2
(45) Date of Patent: Aug. 22, 2023

(54) PROTECTION OF PERSONAL DATA CONTAINED ON AN RFID-ENABLED DEVICE

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 0 days.

(21) Appl. No.: 17/700,783

(22) Filed: Mar. 22, 2022

(65) Prior Publication Data

US 2022/0318528 A1 Oct. 6, 2022

Related U.S. Application Data

(63) Continuation of application No. 17/028,299, filed on Sep. 22, 2020, now Pat. No. 11,281,871, which is a continuation of application No. 16/460,264, filed on Jul. 2, 2019, now Pat. No. 10,783,335, which is a continuation of application No. 16/126,448, filed on Sep. 10, 2018, now Pat. No. 10,360,417, which is a continuation of application No. 15/445,328, filed on Feb. 28, 2017, now Pat. No. 10,073,995.

(60) Provisional application No. 62/301,899, filed on Mar. 1, 2016.

(51) Int. Cl.
*G06K 7/10* (2006.01)
*G06K 19/073* (2006.01)
*H04K 3/00* (2006.01)

(52) U.S. Cl.
CPC ... *G06K 7/10267* (2013.01); *G06K 19/07309* (2013.01); *G06K 19/07318* (2013.01); *G06K 19/07345* (2013.01); *G06K 7/10257* (2013.01); *H04K 3/86* (2013.01)

(58) Field of Classification Search
CPC .......... G06K 7/10267; G06K 7/10257; G06K 19/07309; G06K 19/07318; G06K 19/07345; H04K 3/86
See application file for complete search history.

(56) References Cited

U.S. PATENT DOCUMENTS

| | | | |
|---|---|---|---|
| 5,642,095 | A | 6/1997 | Cook |
| 7,482,925 | B2 | 1/2009 | Hammad et al. |
| 2004/0223481 | A1 | 11/2004 | Juels et al. |
| 2006/0293027 | A1 | 12/2006 | Hammad et al. |
| 2009/0021343 | A1 | 1/2009 | Sinha |
| 2009/0224035 | A1 | 9/2009 | Deborgies |

(Continued)

FOREIGN PATENT DOCUMENTS

| | | |
|---|---|---|
| RU | 2504836 C2 | 1/2014 |
| WO | 2014171955 A1 | 10/2014 |

OTHER PUBLICATIONS

Thinkgeek, RFID Blocking Wallet, http://www.thinkgeek.com/product/8cdd/, acccesed Dec. 12, 2013.

(Continued)

*Primary Examiner* — Laura A Gudorf
(74) *Attorney, Agent, or Firm* — Carter, DeLuca & Farrell LLP

(57) ABSTRACT

A system for protecting personal data contained on an RFID-enabled device, suitable for use with an RFID system including an RFID reader configured to extract information from an RFID chip associated with the RFID-enabled device, includes a personal data protection system including a personal data protection device configured to prevent reading of the RFID chip associated with an RFID-enabled personal item.

13 Claims, 6 Drawing Sheets

(56) References Cited

U.S. PATENT DOCUMENTS

| | | |
|---|---|---|
| 2010/0045455 A1 | 2/2010 | Mazzolini et al. |
| 2010/0060452 A1 | 3/2010 | Schuster |
| 2010/0201534 A1 | 8/2010 | Busch-Sorensen |
| 2012/0228168 A1 | 9/2012 | Kitchen |
| 2013/0106576 A1 | 5/2013 | Hinman |
| 2014/0118116 A1* | 5/2014 | Lavedas ................ H01Q 7/00 340/10.3 |
| 2015/0296608 A1 | 10/2015 | McFadden et al. |
| 2015/0311998 A1 | 10/2015 | Harris et al. |
| 2016/0142174 A1 | 5/2016 | Fine et al. |

OTHER PUBLICATIONS

Identity Stronghold, Protect Your Information-Identity Stronghold—#1 Manufacturer of RFID Blocking Wallets, http://www.idstronghold.com/protect-your-information.asp, accessed Dec. 12, 2013.
Travel Essentials, RFID-Blocking Technology Stops Theft, Get the 4-1-1 on RFID, http://www.travelessentials.com/rfid-blocking-technology-stops-theft.aspx, accessed Dec. 13, 2013.
E-SMART Technologies Inc., Super Smart Card, http://www.e-smart.com/products_ssc.html, accessed Dec. 20, 2013.
Answerbag, "How are RFID tags made?" Feb. 24, 2010, http://www.answerbag.com/q_view/1932923, accessed Dec. 12, 2013.
The RFID Network, "What is RFID?" Radio Frequency Identification, Oct. 24, 2011, http://www.rfid.net/basics, accessed Dec. 12, 2013.
International Search Report and Written Opinion dated Jun. 19, 2017 in corresponding International Application No. PCT/US17/19966, 16 pages.
Supplementary European Search Report dated Oct. 11, 2019 issued in corresponding EP Appln No. 17760618.3.
European Examination Report dated May 29, 2020 issued in corresponding EP Appln. No. 17760618.3.
Russian Office Action dated Jun. 23, 2020 issued in corresponding TH Appln. No. 2018133568/07.
European Examination Report dated Oct. 2, 2020 issued in corresponding EP Appln. No. 17 760 618.3.
European Examination Report dated Sep. 15, 2022 issued in corresponding EP Appln.No. 17 760 618.3.
Office Action issued in corresponding Canadian Application, CA 3,016,432 dated Mar. 14, 2023 (4 pages).

* cited by examiner

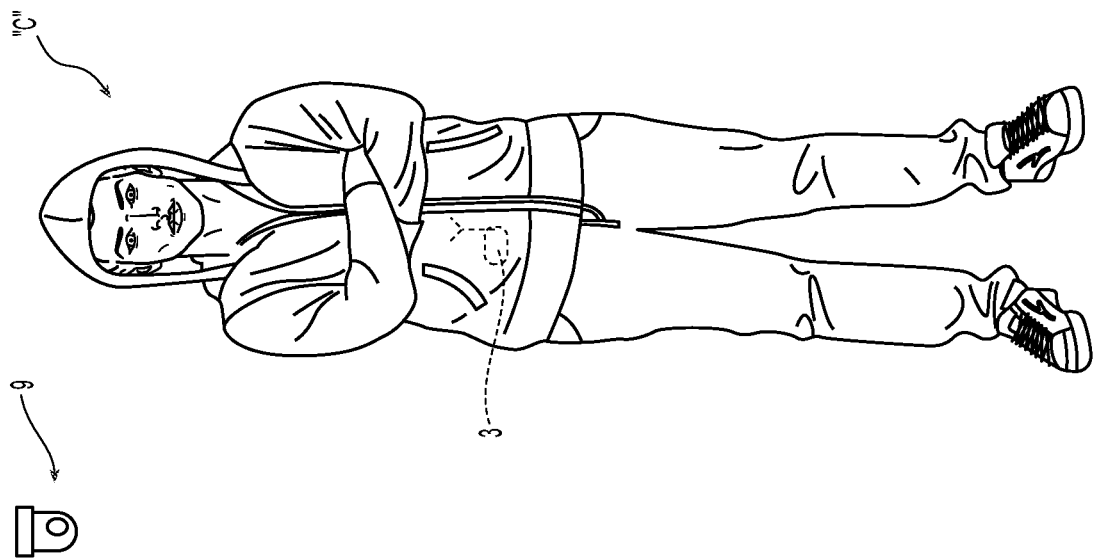
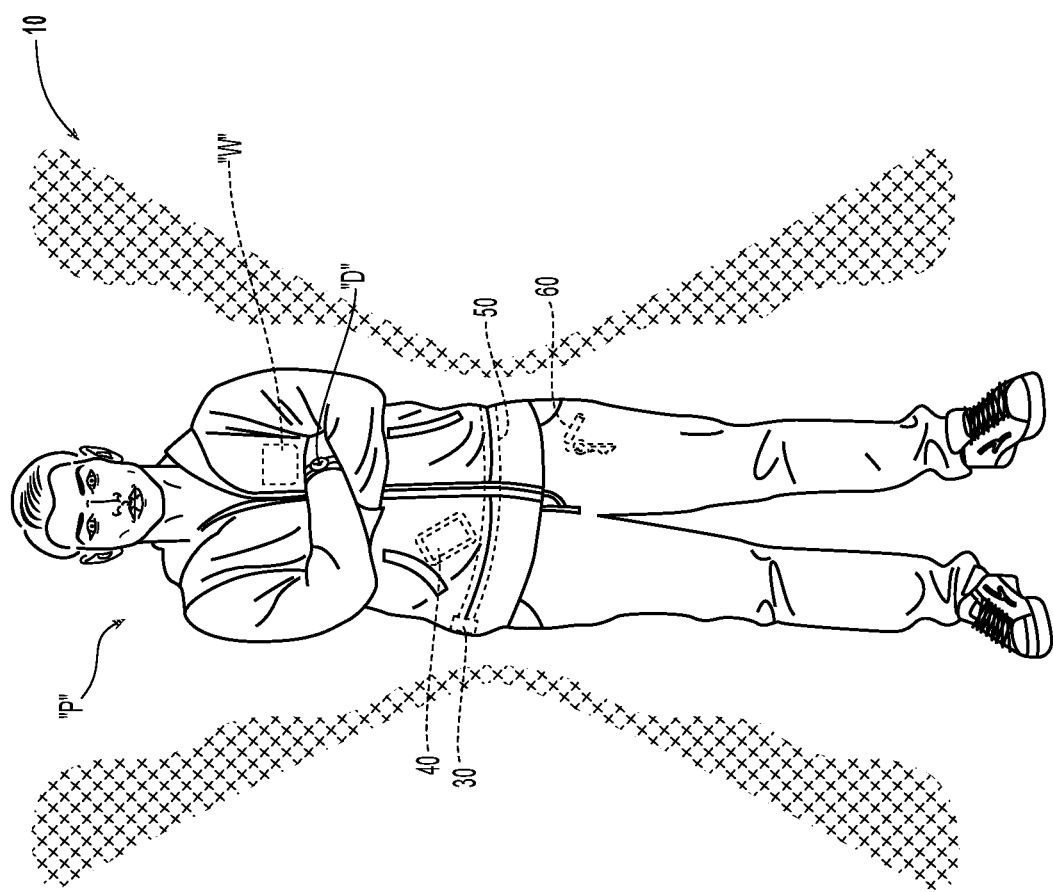
FIG. 3

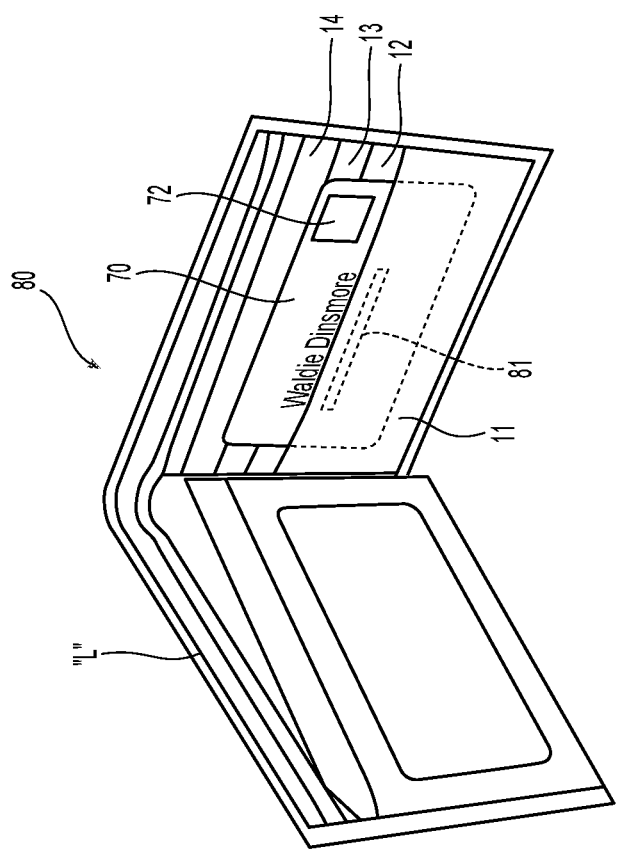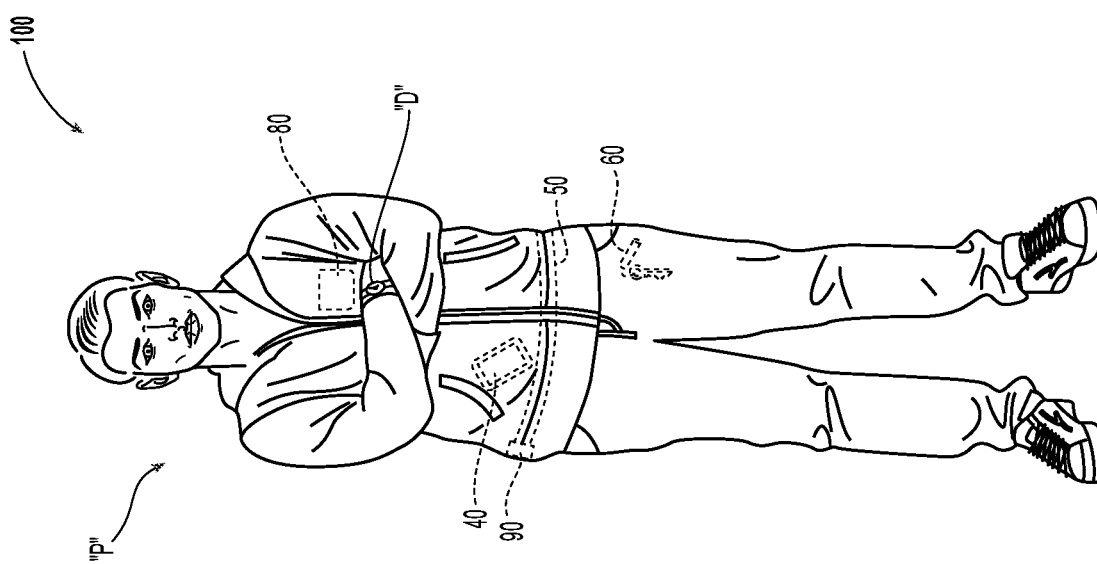

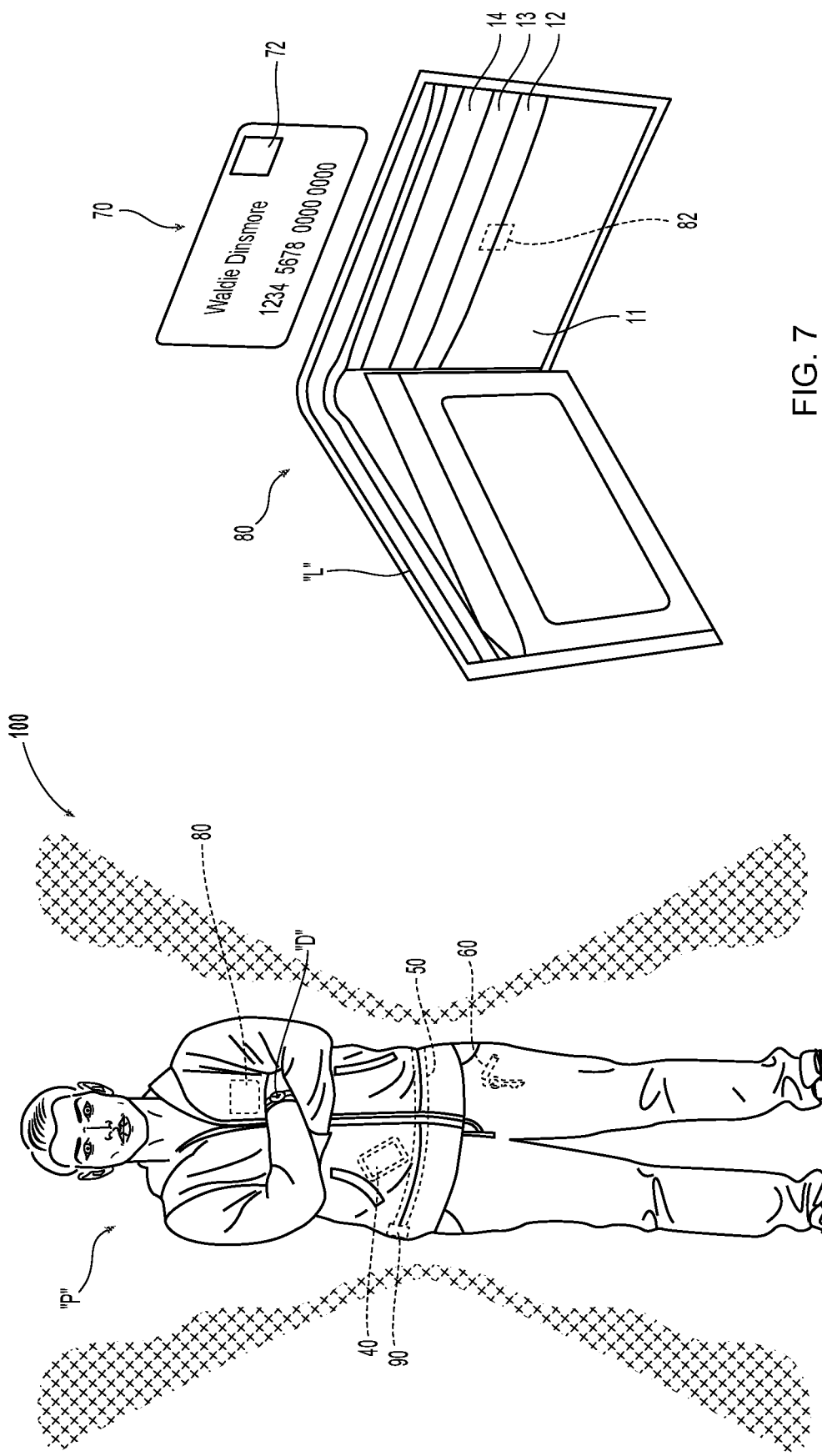

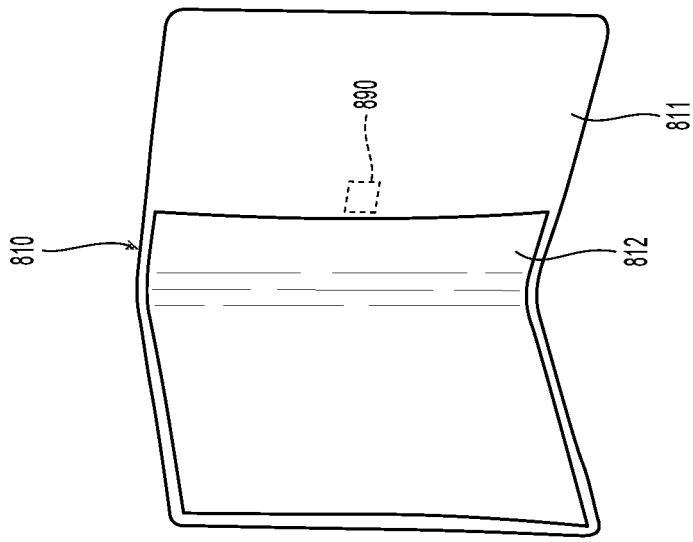
FIG. 9
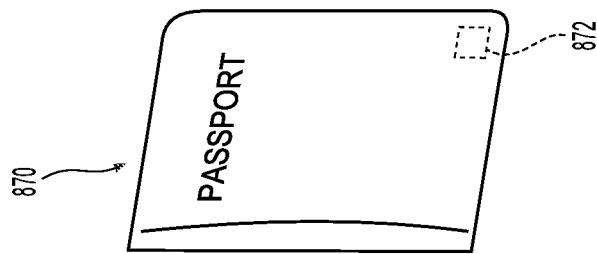
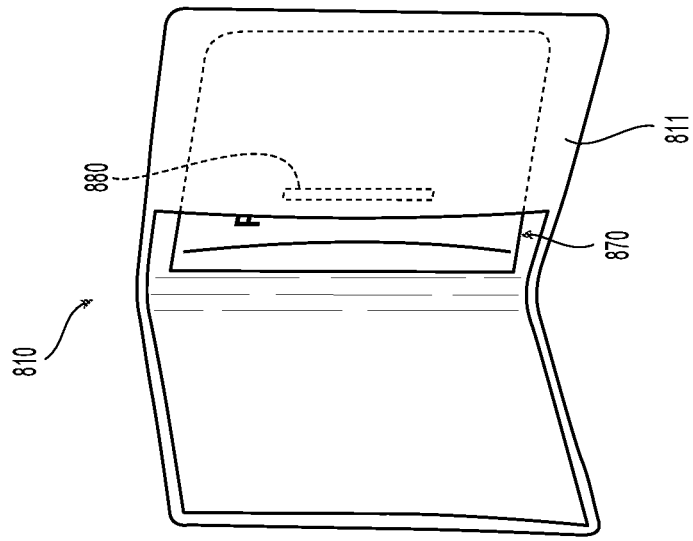
FIG. 8

PROTECTION OF PERSONAL DATA CONTAINED ON AN RFID-ENABLED DEVICE

CROSS-REFERENCE TO RELATED APPLICATION

The present application is a continuation of U.S. patent application Ser. No. 17/028,299, filed Sep. 22, 2020, now U.S. Pat. No. 11,281,871, which is a continuation of U.S. patent application Ser. No. 16/460,264, filed Jul. 2, 2019, now U.S. Pat. No. 10,783,335, which is a continuation of U.S. patent application Ser. No. 16/126,448, filed on Sep. 10, 2018, now U.S. Pat. No. 10,360,417, which is a continuation of U.S. patent application Ser. No. 15/445,328, filed on Feb. 28, 2017, now U.S. Pat. No. 10,073,995, which claims the benefit of and priority to U.S. Provisional Patent Application No. 62/301,899, filed on Mar. 1, 2016. The disclosures of all of the foregoing applications are incorporated in their entirety by reference herein.

BACKGROUND

1. Technical Field

The present disclosure relates to the use of radio-frequency identification (RFID) systems. More particularly, the present disclosure relates to devices, systems and methods for protecting personal data contained on an RFID-enabled device.

2. Discussion of Related Art

Contactless smartcards are increasingly available to consumers as an alternative to magnetic strip cards as a convenient way for storing personal data. Contactless smartcards are credit-card sized cards with embedded integrated circuits (also referred to as ICs, chips, or microchips). The chips used in contactless smartcards can be manufactured in a form called an RFID chip. RFID stands for Radio-Frequency IDentification. The acronym generally refers to small electronic devices that consist of a small chip and an antenna used to transmit data over radio frequency (RF) waves. Contactless smartcards are sometimes referred to as RFID-enabled cards, chip cards, or integrated circuit cards (ICCs).

Consumer RFID payment systems have been implemented that allow individuals to make an electronic payment for purchases, whereby payment can be made by simply waving a contactless smartcard (or a key fob, etc.) in front of a reader. Whereas magnetic strip cards and contact smartcards must come in physical contact with a reader, contactless smartcards can exchange information with a reader via magnetic, RF, infrared radiation or light. A typical RFID system is composed of three components: a reader (or "interrogator"); an RFID device (or "transponder"); and a host computer. The RFID device is composed of an antenna coil (e.g., wire loop or printed-circuit loop antenna) and a microchip that includes basic modulation circuitry and non-volatile memory. "Active" RFID devices are powered by batteries or other energy sources. "Passive" RFID devices lack power sources of their own; the power is supplied by the reader.

A multitude of contactless credit and debit cards, driver's licenses, transit cards, medical information cards, insurance cards, student ID cards, and all U.S. passports issued since 2006 as well as passports from many other countries are equipped with RFID chips. RFID chips can store all the personal data printed in a passport (e.g., name, birth date, address and physical descriptors) as well as the data for an electronic image of the passport photo. RFID-enabled credit cards can store the authorized card-holder's name, address, account number as well as the card expiration date on the RFID chip. Some smartcards include math co-processors for performing complex encryption algorithms. By virtue of their ability to store data on an embedded microchip, along with the convenience of not having to swipe a card through a scanner, or hand it to a cashier, contactless smartcards likely will continue to find new applications in the fields of banking, transportation, healthcare, insurance, social security, and other personal data.

In order to obtain the information contained on a smartcard, an RFID reader is used to activate the RFID device with RF energy and to extract information from the RFID chip. Contactless smartcards do not typically have an embedded power source. One common approach to providing power to the embedded chip is via a modulated magnetic field that induces a current in an antenna coil, which is typically laminated as an internal layer of a smartcard. This allows the information to be obtained from the embedded chip.

The ability to control the personal information one reveals, and who can access that information, has become a growing concern as that information is increasingly available electronically. Identity theft and identity fraud are terms used to refer to crimes in which someone wrongfully obtains and uses another person's personal data in some way that involves fraud or deception, typically for economic gain. In 2012, according to a report issued by the Bureau of Justice Statistics, 16.6 million people fell victim to identity theft, amounting to financial losses of $24.7 billion, paid by consumers and companies. Wireless identity theft, also known as contactless identity theft or RFID identity theft, is a form of identity theft wherein an individual's personal data is compromised via wireless devices.

Various methods and apparatus have been devised for shielding smartcards from RF electromagnetic fields which impart energy to power the RFID chip. One example of a reference that describes shielding smartcards is U.S. Pat. No. 7,482,925 assigned to Visa U.S.A. (herein "Visa"). Some of the embodiments described in Visa are temporary security measures to protect and shield newly-issued smartcards during transport through the mail to their owners, such as envelopes with metalized coatings and electromagnetic-shielding stickers attached to smartcards. Visa also describes a wallet with an "RF shield liner" configured to attenuate RF signals within the operation frequency range of the contactless portable consumer device contained inside a holding pocket when the wallet is folded in a closed configuration.

If a smartcard is not shielded by an RF shielding enclosure, the RFID chip can be powered up and accessed without the card holder's knowledge. Basically, anyone with an appropriately equipped scanner and sufficiently close access to the smartcard can activate it and read its contents. In some cases, the unauthorized scanning of a smartcard may be accidental, such as when the card holder is unaware that he has come within range of an active RFID reader. In other cases, the unauthorized scanning of the card may be intentionally executed by a party with a covert reader who is seeking to obtain the card holder's personal information without their consent.

SUMMARY

Various embodiments of the present disclosure provide methods, devices, and systems for use in detection, prevention, protection against, and/or response to RFID identity theft.

According to an aspect of the present disclosure a personal data protection system is provided. The system is suitable for use with an RFID system including an RFID reader configured to extract information from an RFID chip associated with the RFID-enabled device. The system includes a personal data protection system including a personal data protection device configured to prevent reading of the RFID chip associated with an RFID-enabled personal item.

According to another aspect of the present disclosure a method of protecting personal data is provided. The method includes providing a personal data protection device configured to detect a carrier signal of an RFID reader and, in response thereto, to prevent reading of an RFID chip associated with an RFID-enabled personal item. If it is determined that the carrier signal of an RFID reader has been detected, then the personal data protection device is activated. Upon activation of the personal data protection device, one or more signals are emitted to prevent reading of the RFID chip associated with the RFID-enabled personal item.

According to another aspect of the present disclosure a method of protecting personal data is provided and includes providing a holder having a pocket configured to receive an RFID-enabled personal item therein and configured to transmit an alert signal when the RFID-enabled personal item is removed from the pocket. The holder includes a sensor and a resilient biasing member configured to bias the RFID-enabled personal item against the sensor such that removal of the RFID-enabled personal item from the pocket causes the sensor to transmit the alert signal. If it is determined that the alert signal has been transmitted, then a personal data protection device is activated. The personal data protection device is configured to prevent reading of an RFID chip associated with the RFID-enabled personal item.

In any of the aspects, the holder may be a wallet, a purse, a passport holder, or organizer configured to hold an RFID-enabled device.

In any of the aspects, upon activation of the personal data protection device, one or more potential sources of the carrier signal are identified. In any of the aspects, the one or more potential sources of the carrier signal are electronically tagged.

BRIEF DESCRIPTION OF THE DRAWINGS

The above and other aspects and features of the presently-disclosed methods, devices, and systems for protecting personal data contained on an RFID-enabled device will become apparent to those of ordinary skill in the art when descriptions of various embodiments thereof are read with reference to the accompanying drawings, of which:

FIG. 3 is a perspective view, partially shown in phantom lines, of a personal data protection system for use with RFID-enabled devices associated with a first person, and showing a covert RFID reader associated with a second person, in accordance with an embodiment of the present disclosure;

FIG. 4 is a perspective view of a personal data protection system, partially shown in phantom lines, for use with RFID-enabled devices associated with a first person in accordance with another embodiment of the present disclosure;

FIG. 5 is a schematic view of a holder with credit-card sized pockets, showing an RFID-enabled card retained in a first pocket, and a resilient biasing member, shown in phantom lines, associated with a first wall of the first pocket in accordance with an embodiment of the present disclosure;

FIG. 6 is a perspective view of the personal data protection system of FIG. 4 configured in an active-protection enabled state in accordance with an embodiment of the present disclosure;

FIG. 7 is a schematic view of the holder of FIG. 5, showing the RFID-enabled card removed from the first pocket, the holder including a sensor, shown in phantom lines, associated with a second wall of the first pocket in accordance with an embodiment of the present disclosure;

FIG. 8 is a schematic view of a passport holder, showing an RFID-enabled passport, partially shown in phantom lines, retained in a pocket of the passport holder, and a resilient biasing member, shown in phantom lines, associated with a first wall of the pocket in accordance with an embodiment of the present disclosure;

FIG. 9 is a perspective view of the passport holder of FIG. 8 showing the passport removed from the pocket, the passport holder including a sensor, shown in phantom lines, associated with a second wall of the pocket in accordance with an embodiment of the present disclosure;

DETAILED DESCRIPTION

Figure 1:
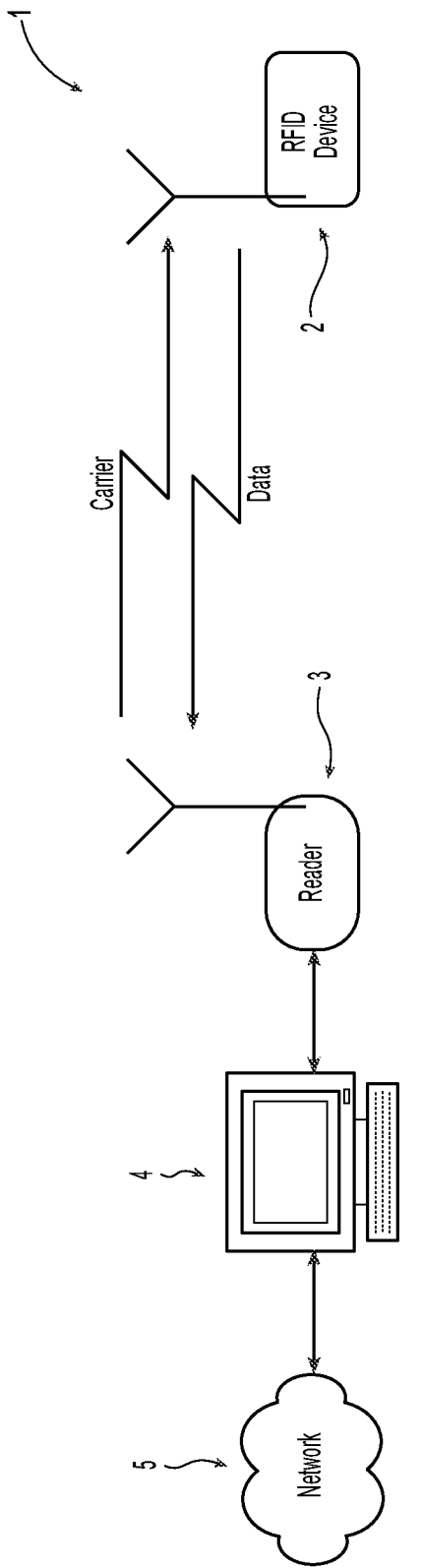
FIG. 1 is a schematic view of an RFID system including an RFID device, a reader, and a host computer in accordance with an embodiment of the present disclosure.

Hereinafter, embodiments of methods, devices, and systems for protecting personal data contained on an RFID-enabled device of the present disclosure are described with reference to the accompanying drawings. Like reference numerals may refer to similar or identical elements throughout the description of the figures. It is to be understood that in some instances various aspects of the electronic devices may be shown schematically or may be shown exaggerated or altered to facilitate an understanding of the presently-disclosed personal data protection system embodiments. As shown in the drawings and as used in this description, and as is traditional when referring to relative positioning on an object, the term "proximal" refers to that portion of the apparatus, or component thereof, closer to the user and the term "distal" refers to that portion of the apparatus, or component thereof, farther from the user.

This description may use the phrases "in an embodiment," "in embodiments," "in some embodiments," or "in other embodiments," which may each refer to one or more of the same or different embodiments in accordance with the present disclosure.

As it is used in this description, "personal data" generally refers to any information relating to an identified or identifiable person. As it is used in this description, "an identifiable person" generally refers to one who can be identified, either directly or indirectly, by reference to an identification number or to one or more factors specific to the individual's physical, physiological, mental, economic, cultural, or social identity. As used herein, "personally identifiable information" generally refers to any information that can be used on its own or in conjunction with other information to identify, contact, or locate a person, or to identify an individual in context. This information can be maintained in either paper, electronic or other media. For the purposes of this description, the terms "personal data" and "personally identifiable information" are used interchangeably herein, and may include, for example, name, mailing and home address, email address, telephone number, social security number, date of birth, birthplace, driver's license number, credit card numbers, national identification number, alien registration number, passport number, employer or taxpayer identification number, unique biometric data, electronic identification number or routing code, telecommunication identifying information, or other identifying number or code.

As used herein, the terms "carrier signal" and "carrier" refer to a wave that is intended to be modulated. As it is used in this description, "modulation" generally refers to the alteration or modification of any electronic parameter by another. Characteristics of the carrier that may be modulated include the amplitude and phase angle. Modulation by an undesirable signal is referred to as "cross modulation."

Various embodiments of the present disclosure provide methods, devices, and systems for use in detection, prevention, protection against, and/or response to RFID identity theft. Various personal data protection system embodiments described herein utilize RFID system components. RFID systems described herein may employ either far-field technology, in which the distance between the RFID reader and the RFID device is large compared to the wavelength of the carrier signal, or near-field technology, in which the operating distance is less than one wavelength of the carrier signal, to facilitate communication between the reader and the RFID device. In far-field applications, the reader generates and transmits an RF signal via an antenna assembly to all RFID devices within range of the antenna assembly. RFID devices that receive the RF signal respond to the reader, e.g., using a backscattering technique in which the RFID device modulates and reflects the received RF signal. In near-field applications, the reader and RFID device communicate via mutual inductance between corresponding reader and RFID device inductors.

RFID-enabled devices (e.g., banking card 70 shown in FIGS. 3 and 5) described herein may conform to the standards of standard-setting bodies such as international standard ISO 7810, including the commonly used ID-1 format, ID-2, ID-3 and ID-1000 formats. The ID-1 format specifies a size of 85.60×53.98 mm (3.370×2.125 in), which is commonly used for banking cards (ATM cards, credit cards, debit cards, etc.) and also for driving licenses in many countries. ISO 7816 defines ID-1 identification cards with an embedded chip and contact surfaces for power, clock, reset, and serial-data signals. ISO 14443 defines identification cards with an embedded chip and a magnetic loop antenna that operates at 13.56 MHz (RFID). International Civil Aviation Organization (ICAO) standards for Machine Readable Travel Documents (MRTDs) specify a cryptographically signed file format and authentication protocol for storing biometric features (e.g., photos of an individual's face, fingerprint and/or iris) in ISO 14443 RFID chips. These and other card formats may be applied to embodiments of the present disclosure. It will be understood by persons skilled in the art that the embodiments described herein are intended to use any other suitable standards that are developed in the future.

In FIG. 1, an RFID system 1 is schematically illustrated and includes an RFID device 2, an RFID reader 3, and a processing system 4. RFID reader 3 (also referred herein to as "reader 3") is communicatively coupled to the processing system 4. An embodiment of the RFID device 2 is shown in more detail in FIG. 2. It is to be understood, however, that other RFID device embodiments (e.g., banking card 70 shown in FIGS. 5 and 7) may also be used.

Reader 3 may be fixed, mobile, wireless, or handheld. In some embodiments, the reader 3 includes RF transmission section including an RF carrier generator, a receiving section, and a data decoding sections. Reader 3 may include one or more antennas assemblies configured to be energized with a carrier signal. Antenna assemblies can take a variety of shapes and sizes, e.g., depending on the environment or the required range. Antenna assemblies can be mounted on a variety of surfaces or physical objects, or on building structures, e.g., built into a door frame to accept data from persons or objects passing through. In some embodiments, the RFID system 1 includes an RFID subsystem coupled to the antenna assembly and configured to process data provided by the antenna assembly. RFID system 1 may additionally, or alternatively, include a user interface configured to provide information to the user of the processing system 4.

Processing system 4 may include any type of computing device, computational circuit, or any type of processor or processing circuit capable of executing a series of instructions that are stored in a memory. In some embodiments, as shown in FIG. 1, the processing system 4 is communicatively coupled to a network 5, e.g., the Ethernet or other computer networking technologies.

When the RFID reader 3 is operating and the RFID device 2 is within the range of the antenna assembly of the RFID reader 3, the RFID device 2 is energized by a time-varying electromagnetic RF wave (carrier signal) that is transmitted by the RFID reader 3. In some embodiments, the RFID device 2 is configured to divide the carrier frequency down to generate an on-board clock for state machines, counters, etc., and to derive the data transmission bit rate for data returned to the reader 3.

Figure 2:
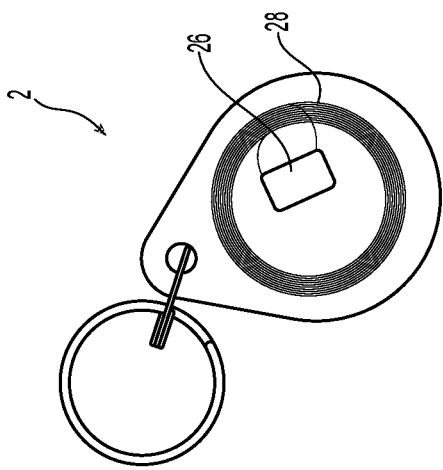
FIG. 2 is a schematic view of an RFID device coupled to a key ring in accordance with an embodiment of the present disclosure.

FIG. 2 shows an embodiment of the RFID device 2 of FIG. 1 that includes an antenna coil 28 (wire loop antenna) attached to a microchip 26. When an RF field passes through the antenna coil 28 of the RFID device 2, there is an AC voltage generated across the coil 28. This voltage is rectified to supply power to the microchip 26, and the information stored in the non-volatile memory of the microchip 26 is transmitted to an RFID reader (e.g., reader 3 shown in FIG. 1).

FIG. 3 shows a personal data protection system 10 for use with RFID-enabled devices associated with a person "P," such as an RFID-enabled key fob 60, a wallet "W" containing one more RFID-enabled cards (e.g., banking card 70 shown in FIG. 7), a personal mobile device 40 (e.g., a smartphone, tablet, or e-reader), and/or an RFID-enabled device "D" worn on the wrist of the person "P." Personal data protection system 10 includes a personal data protection device 30 (also referred herein to as "device 30") including a power source, e.g., a lithium battery, and one or more antennas. Device 30 is capable of detecting a carrier signal transmitted from an RFID reader (e.g., reader 3 shown in FIG. 1). Device 30 generally includes a first and a second mode of operation, as described herein. In some embodiments, the device 30 is configured to communicate with an electronic tagging system 9, which may include a beacon and/or a camera.

In some embodiments, the device 30 is configured to be automatically switchable from a first mode of operation to a second mode of operation based on the detection of the carrier signal. In some embodiments, the device 30 is configured to be automatically switchable from a first operation mode, wherein the device 30 is capable of detecting the emission of a carrier signal by an RFID reader, to a second operation mode, wherein the device 30 is capable of blocking or otherwise preventing the carrier signal from reaching the RFID-enabled device(s) associated with the person "P" and/or capable of preventing a modulated signal transmitted by an RFID-enabled device associated with the person "P" from being clearly received by the RFID reader 3. Device 30 may additionally, or alternatively, be configured to allow the person "P" to manually set, or reset, the mode of operation of the device 30, from the first operation mode to the second operation mode (also referred to herein as the "active-protection enabled mode") and/or from the second operation mode to the first operation mode.

In some embodiments, the device 30 is capable of monitoring its power source, and may be configured to activate an indicatory device, e.g., LED (Light Emitting Diode) or audible alarm, to alert the person "P" of a low-power condition. In some embodiments, as shown in FIG. 1, the device 30 is configured to be attached to a belt 50 worn by a person "P." For the purposes herein, the device 30 is described in terms of a standalone unit; however, it is contemplated that a portable wireless device, e.g., a smartphone or laptop computer, may be configured to perform the functionality of the device 30.

FIGS. 4 through 7 show a personal data protection system 100 for use with various RFID-enabled devices (e.g., banking card 70 shown in FIGS. 5 and 7). System 100 generally includes a personal data protection device 90 and a holder 80, which may be configured with RF shielding material and includes one or more pockets configured to securely hold one or more RFID-enabled personal items. Personal data protection system 100 is configured to allow a person "P" to remove an RFID-enabled personal item (e.g., banking card 70) from the holder 80, whereby the personal data contained on the RFID-enabled personal item is protected within a predetermined range of the personal data protection device 90 (also referred herein to as "device 90"). This allows the person "P," e.g., waiting in line at Dunkin Donuts, to safely remove the RFID-enabled personal item from the holder 80, whereby the RFID device (e.g., RFID device 72 associated with banking card 70) cannot be clearly read until the person "P" extends the banking card 70 towards the authorized RFID reader, such that the RFID device 72 is temporarily positioned outside of the predetermined range of the device 90.

In some embodiments, the holder 80 is configured to transmit an alert signal when an RFID-enabled personal item (e.g., banking card 70) is removed from a pocket, and may include a sensor 82 and a resilient biasing member 81 configured to bias the RFID-enabled personal item against the sensor 82 such that removal of the RFID-enabled personal item from the pocket causes the sensor 82 to transmit the alert signal. Device 90 is configured to detect the alert signal. Upon detection of the emission of the alert signal from the holder 80, the device 90 activates an "active-protection enabled mode," wherein the device 90 is capable of blocking or otherwise preventing a carrier signal from reaching the RFID-enabled personal item 70 and/or capable of preventing a modulated signal transmitted by the RFID-enabled personal item 70 from being clearly received by an RFID reader (e.g., covert RFID reader 3 associated with a criminal "C" shown in FIG. 3). Device 90 is similar to the device 30 shown in FIG. 3, except for the capability to detect the emission of the alert signal from the holder 80, and further description of the like elements is omitted in the interests of brevity.

FIGS. 8 and 9 show a passport holder 810 for use with the personal data protection device 90 of FIGS. 3 and 4. Passport holder 810 is configured to securely hold a passport 870 that includes an RFID device 872. In some embodiments, the passport holder 810 includes a single pocket defined between a first wall 811 and a second wall 812 configured to receive the passport 870 therein. One or both of the first wall 811 and the second wall 812 may be configured with RF shielding material.

When used in conjunction with the device 90, the passport 870 may be removed from the passport holder 810 and the personal data contained on the RFID device 872 is protected within a predetermined range of the device 90. Passport holder 810 is configured to transmit an alert signal when the passport 870 is removed from a pocket thereof, and may include a sensor 890 and a resilient biasing member 880 configured to bias the passport 870 against the sensor 890 such that removal of the passport 870 from the pocket causes the sensor 890 to transmit the alert signal. In some embodiments, as shown in FIGS. 8 and 9, the resilient biasing member 880 is associated with a first wall 811, and the sensor 890 is associated with the second wall 812.

Hereinafter, methods of protecting personal data contained on an RFID-enabled device in accordance with the present disclosure, are described with reference to FIGS. 10 and 11. It is to be understood that the steps of the methods provided herein may be performed in combination and in a different order than presented herein without departing from the scope of the disclosure.

Figure 10:
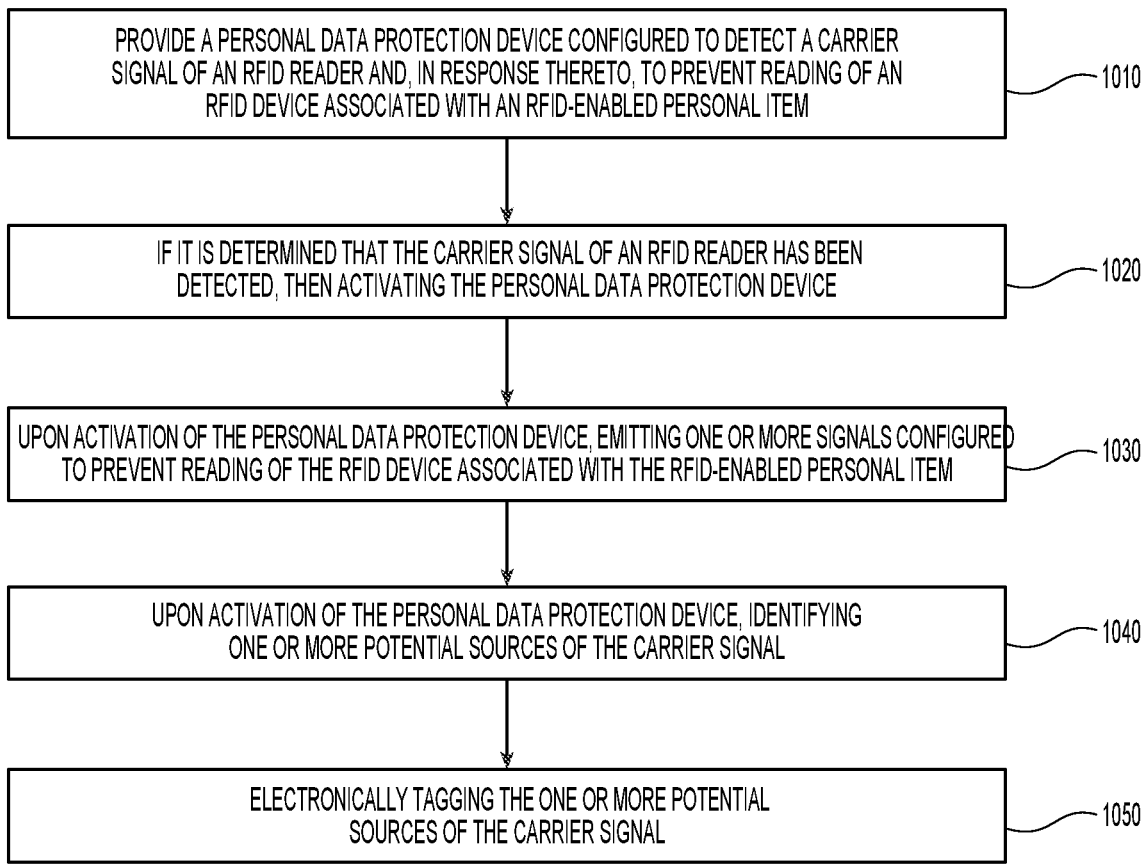
FIG. 10 is a flowchart illustrating a method of protecting personal data in accordance with an embodiment of the present disclosure.

FIG. 10 is a flowchart illustrating a method of protecting personal data contained on an RFID-enabled device according to an embodiment of the present disclosure. In step 1010, a personal data protection device 30 is provided. The personal data protection device 30 is configured to detect a carrier signal of an RFID reader 3 and, in response thereto, to prevent reading of an RFID device 72 associated with an RFID-enabled personal item 70.

In step 1020, if it is determined that the carrier signal of an RFID reader 3 has been detected, then the personal data protection device 30 is activated. In some embodiments, the device 30 automatically switches from a first operation state, wherein the device 30 is capable of detecting the emission of a carrier signal by an active RFID reader 3, to a second operation state, wherein the device 30 is capable of blocking or otherwise preventing the carrier signal from reaching the RFID device 72 and/or capable of preventing a modulated signal transmitted by RFID device 72 from being clearly received by the RFID reader 3.

In step 1030, upon activation of the personal data protection device 30, one or more signals are emitted. The emitted signals are configured to prevent reading of the RFID device 72 associated with the RFID-enabled personal item 70.

In step 1040, upon activation of the personal data protection device 30, one or more potential sources of the carrier signal are identified.

In step 1040, the one or more potential sources of the carrier signal are electronically tagged.

Figure 11:
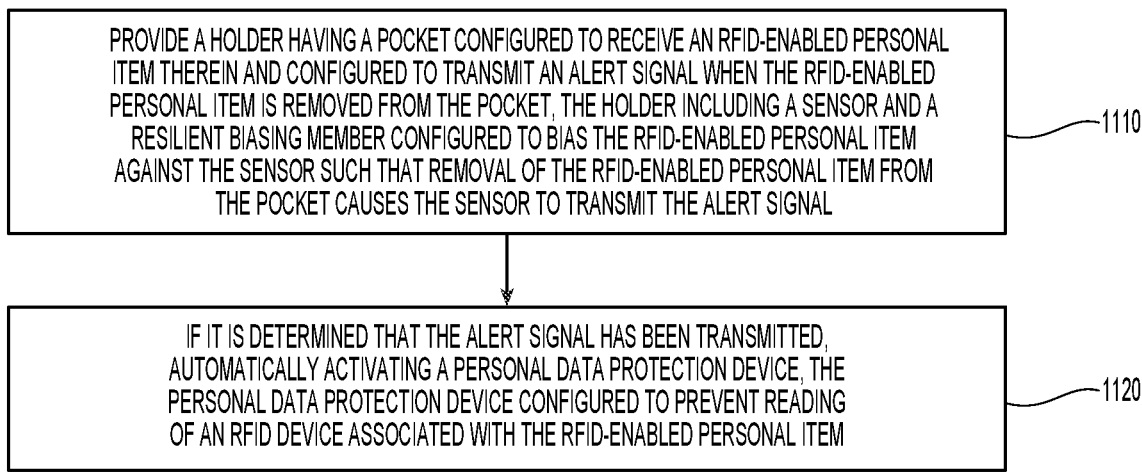
FIG. 11 is a flowchart illustrating a method of protecting personal data in accordance with an embodiment of the present disclosure.

FIG. 11 is a flowchart illustrating a method of protecting personal data contained on an RFID-enabled device according to an embodiment of the present disclosure. In step 1110, a holder 80 is provided that includes a pocket configured to receive an RFID-enabled personal item (e.g., banking card 70) therein. The holder includes a sensor 82 and a resilient biasing member 81 configured to bias the RFID-enabled personal item 70 against the sensor 82 such that removal of the RFID-enabled personal item 70 from the pocket causes the sensor 82 to transmit an alert signal.

In step 1120, if it is determined that the alert signal has been transmitted, automatically activating a personal data protection device 90 configured to prevent reading of an RFID device 72 associated with the RFID-enabled personal item within a predetermined range of the personal data protection device 90.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A system for protecting personal data stored on a radio frequency identification (RFID) device, the system comprising:
    an RFID device including an RFID chip; and
    a personal data protection device configured to:
        detect an emission of a carrier signal by a RFID reader;
        prevent reading of the RFID device based on detection of the emission of the carrier signal; and
        communicate with an electronic tagging system to electronically tag the RFID reader in response to detection of the emission of the carrier signal.

2. The system according to claim 1, wherein the personal data protection device is further configured to prevent a modulated signal transmitted by the RFID device from being clearly received by the RFID reader.

3. The system according to claim 1, wherein the RFID device is a banking card.

4. The system according to claim 1, wherein the personal data protection device is configured to securely hold the RFID device.

5. The system according to claim 4, wherein the personal data protection device is configured to transmit an alert signal when the RFID device is removed from the personal data protection device.

6. The system according to claim 5, wherein the personal data protection device includes a sensor and a resilient biasing member configured to bias the RFID device against the sensor such that removal of the RFID device causes the sensor to transmit the alert signal.

7. The system according to claim 1, wherein the personal data protection device is further configured to emit at least one signal to prevent reading of the RFID device.

8. A method for protecting personal data stored on a radio frequency identification (RFID) device, the method comprising:
    detecting an emission of a carrier signal by a RFID reader at a personal data protection device disposed in proximity to an RFID device;
    activating the personal data protection device to prevent reading of the RFID device based on detection of the emission of the carrier signal; and
    communicating with an electronic tagging system to electronically tag the RFID reader in response to detection of the emission of the carrier signal.

9. The method according to claim 8, wherein the personal data protection device is further configured to prevent a modulated signal transmitted by the RFID device from being clearly received by the RFID reader.

10. The method according to claim 8, wherein the RFID device is a banking card.

11. The method according to claim 8, wherein the personal data protection device is configured to securely hold the RFID device.

12. The method according to claim 11, further comprising:
    transmitting an alert signal when the RFID device is removed from the personal data protection device.

13. The method according to claim 8, further comprising:
    emitting at least one signal from the personal data protection device to prevent reading of the RFID device.

* * * * *